L. TOPF.
APPARATUS FOR AERATING GRAINS OR GRAIN MATERIALS.
APPLICATION FILED OCT. 15, 1912.
1,058,812.
Patented Apr. 15, 1913.
2 SHEETS—SHEET 1.
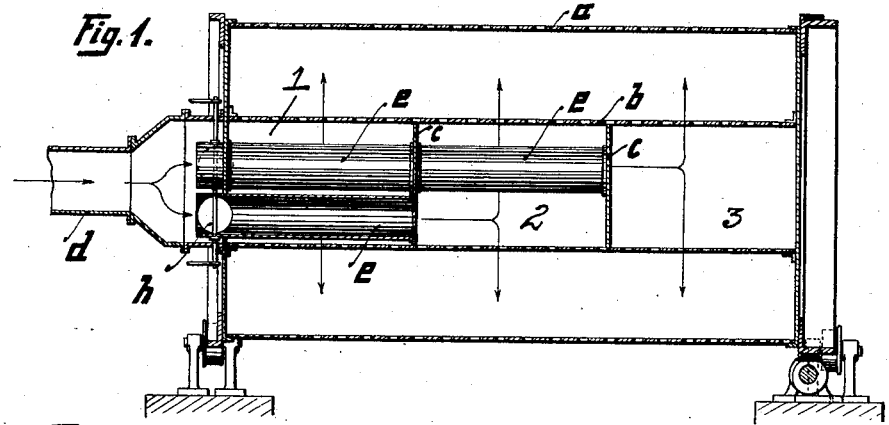
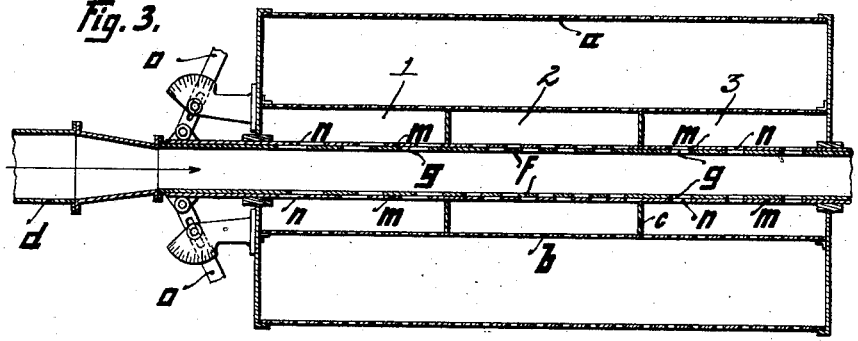
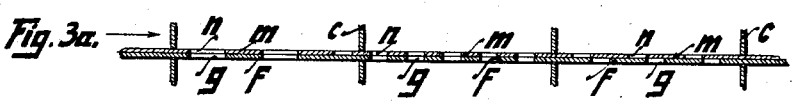
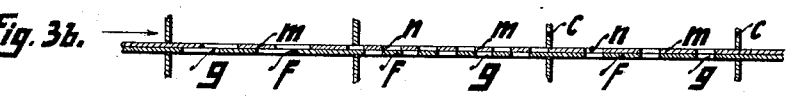
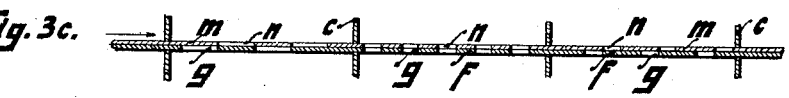
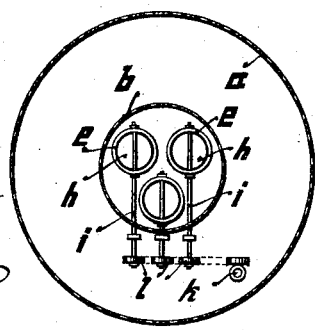
Witnesses:
Inventor: Ludwig Topf L. TOPF.
APPARATUS FOR AERATING GRAINS OR GRAIN MATERIALS.
APPLICATION FILED OCT. 15, 1912.
1,058,812.
Patented Apr. 15, 1913.
2 SHEETS—SHEET 2.
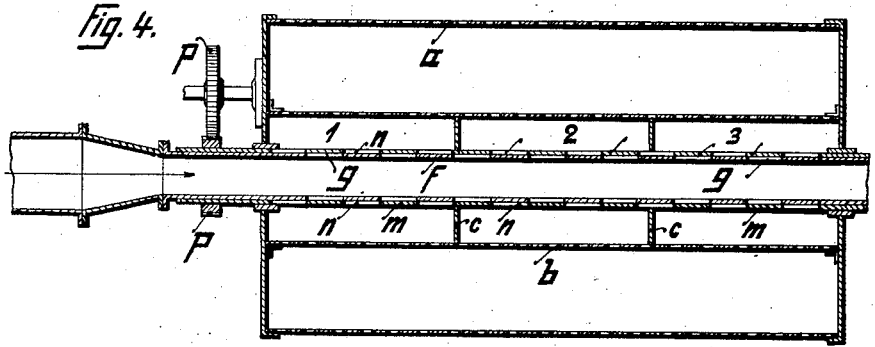
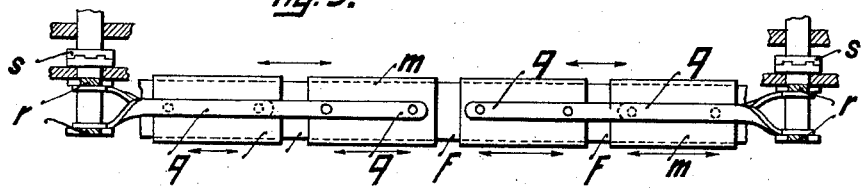
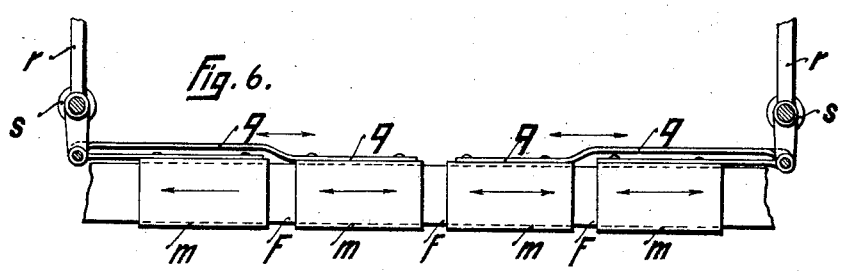
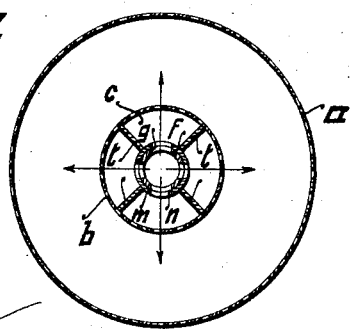
Witnesses:
Inventor:

UNITED STATES PATENT OFFICE.

LUDWIG TOPF, OF ERFURT, GERMANY.

APPARATUS FOR AERATING GRAINS OR GRAIN MATERIALS.

1,058,812.  Specification of Letters Patent.  Patented Apr. 15, 1913.

Application filed October 15, 1912. Serial No. 725,781.

*To all whom it may concern:*

Be it known that I, LUDWIG TOPF, manufacturer, subject of the German Emperor, residing at Erfurt, in the Kingdom of Prussia, German Empire, have invented certain new and useful Improvements in Apparatus for Aerating Grains or Grain Materials, of which the following is a specification.

This invention relates to an apparatus for aerating grains or grain materials, and has for its object to provide for the uniform distribution of the air throughout the length of the aerating drum, for purposes of germinating, curing, drying or similar processes.

It is further the object to uniformly distribute the air from a central or axial air-conduit into all parts of the drum.

In carrying out these objects according to the present invention, the air is introduced into the drum in suitably distributed layers or bodies.

In the accompanying drawings, in which the apparatus is diagrammatically illustrated, Figure 1 is a longitudinal section taken through the drum. Fig. 2 is a transverse sectional view of a drum as shown in Fig. 1, but illustrating a modified damper mechanism. Fig. 3 is one modified form. Figs. 3ª, 3ᵇ, and 3ᶜ show different operative positions of a regulating device which is used in the form shown in Fig. 3. Fig. 4 is a second modified form of the apparatus for carrying out the process. Fig. 5 is a plan view of a second form of regulating device. Fig. 6 is an elevation of the device shown in Fig. 5, and Fig. 7 is a sectional view of the device illustrated in Figs. 3 and 4.

In order to distribute the air in strata or bodies through the central pipe $b$ which is provided with perforations, said pipe can be divided by any desired number of partition walls or plates $c$. The several similar or irregular sections 1, 2 and 3 which are thus formed are connected by one or more connecting-pipes with the main air-pipe $d$. Fig. 1, by way of example, shows one of the dividing-walls $c$ provided with a connecting-pipe $e$ for each one of the sections, said pipes $e$ being joined in any suitable manner to the main pipe $d$. This body of air, since it is inclosed between the partition walls, is forced to pass directly through the perforations of the pipe $b$ into the outer contiguous part of the drum with equal force throughout. Since the action is the same in all the subdivisions of the main pipe, the drum is fed with air uniformly throughout its length by means of a plurality of air-bodies projected one next the other.

The forced distribution of the air can be controlled by any ordinary throttling means. These may be so arranged that the air is distributed in equal quantities from each subdivision or at different pressures. This means can be further arranged so as to control all the inlets $e$ simultaneously. Such an arrangement is shown in Fig. 2. In this arrangement, the shafts $i$ of all the throttling devices $h$, are combined with a common actuating mechanism $k$, $l$, of any suitable type, so that all of said devices are moved simultaneously and in the same way. In this way, all requirements for controlling the air, to suit the particular material being treated, can be met.

Figs. 3 to 6 represent an example of the invention, in which a connecting pipe $f$ is provided, said pipe opening directly into the main air pipe and serving for all the subdivisions. This pipe is provided with outlets $g$ at the points where it passes through the separate chambers 1, 2, 3 of the central pipe $b$, through which openings a certain quantity of air passes into the center pipe and thence into the drum. The connecting pipe $f$, in this case, is provided with some suitable controlling mechanism, which can be actuated from outside. For example, as shown in Figs. 3 to 6, one or more controlling elements $m$, which either partially or wholly surround the pipe $f$, can be used, said elements being provided with suitable sliding or rotating means so as to be longitudinally or rotatably movable on said pipe. The feeding of the air into the individual sections of the central pipe can be, for example, controlled by providing the member $m$ with openings $n$, corresponding to the openings $g$ in the connecting pipe, said openings $n$ being offset relatively to the openings $g$. This construction may be varied as desired, in order to permit the introduction of air into one or more subdivisions of the central pipe, as desired. By way of example, Figs. 3, 3ª, 3ᵇ, 3ᶜ show a diagram whereby by suitable adjustments of the regulating member $m$ and of the air openings $g$, $n$, controlled by the same, the air can be introduced in any desired sequence, that is, into the subdivision 1 (Fig. 3), or into the subdivision 2 (Fig. 3ᶜ), or simultaneously into the subdivisions 1 and 2 (Fig. 3ᵃ), or into the subdivisions 1 and 3 (Fig. 3ᵇ). Also the regulating member $m$ can be given intermediate positions in order to control the amount or velocity of the air flowing through the same. A similar mechanism for the adjustment of the said member by rotation may be provided, as illustrated in Fig. 4, or any other actuating mechanism can obviously be used.

The proper movement can be communicated to the regulating devices from the outside by any suitable mechanism. For example, as shown in Fig. 3, the actuating levers $o$ may be employed, or, according to Fig. 4, the rotary or friction mechanism $p$, can be used. The regulating member may be suitably formed in any number of separate parts. For example, it may consist of two longitudinal members abutting each other end to end, one of them being actuated from each end of the drum. There may also be provided, a common driving mechanism for all the regulating members, the various controlling or driving members being suspended one below the other and providing for the independent adjustment of said members. By way of example, Figs. 5 and 6 show such a means for four subdivisions of the central pipe, each two regulating members being actuated from one end of the drum. In this construction, each element $m$ is connected by any suitable draw-rod $q$, with a suitable external controlling lever $r$. These elements can be operated separately or simultaneously by connecting means $s$.

The partition walls $c$ are advantageous in that they conduct the separate air layers directly from the central pipe into the drum without any previous circulation. In order to increase this effect, they may be projected to a certain degree into the drum from the central pipe in divided masses, and even be extended to the wall of the drum. As shown in Fig. 7, a combination of vertical and radial partition walls $t$ can be employed for each subdivision of the central pipe, in order to distribute the separate air layers radially in a uniform manner.

The moistening of the air can be performed in the ordinary or preferred way and be controlled according to the quantity or bodies of air introduced into the drum.

What I claim as my invention is:—

1. An apparatus for treating grain materials, comprising in combination, a drum, means for introducing air centrally into said drum, and means for subdividing the air-body into smaller bodies for distribution longitudinally of said drum as it issues from said central introducing means.

2. An apparatus for treating grain materials, comprising in combination, a drum, a central air feeding pipe, means subdividing said central pipe into separate chambers, and means for regulating the introduction of air into each chamber.

3. An apparatus for treating grain materials, comprising in combination, a drum, a central air feeding conduit, an air chamber concentric with said feeding conduit, and means for feeding air from said conduit to said chamber in regulated quantities.

4. An apparatus for treating grain materials, comprising in combination, a drum, a central air feeding conduit having outlet openings in its circumference, an air chamber concentric with said feeding conduit, and valve members incasing said feeding conduit and movable to control said outlet openings.

5. An apparatus for treating grain materials, comprising in combination, a drum, a central air feeding conduit, an air chamber mounted concentrically of said air conduit, vertical and radial partitions subdividing said air chamber into sub-chambers and means for feeding air into the spaces between the vertical partitions in regulated order.

In testimony whereof I affix my signature in presence of two witnesses.

LUDWIG TOPF.

Witnesses:
ALFRED HOFFMANN,
HEDWIG HÖPPNER.

---

Copies of this patent may be obtained for five cents each, by addressing the "Commissioner of Patents, Washington, D. C."